United States Patent [19]
Langston

[11] 3,813,527
[45] May 28, 1974

[54] LIQUID DISPENSER WITH ELECTRONIC COMPUTING AND DISPLAY SYSTEM

[75] Inventor: Earl M. Langston, Fort Wayne, Ind.

[73] Assignee: Takeim Corporation, Fort Wayne, Ind.

[22] Filed: Oct. 24, 1972

[21] Appl. No.: 300,432

[52] U.S. Cl............ 235/151.34, 222/70, 235/92 FL
[51] Int. Cl.......................... G06f 15/56, B67d 5/30
[58] Field of Search........ 235/151.34, 151.3, 92 FL; 222/70, 23, 32, 33, 36, 52, 76

[56] References Cited
UNITED STATES PATENTS

| | | | |
|---|---|---|---|
| 3,580,421 | 5/1971 | Bickford | 235/92 FL |
| 3,593,883 | 7/1971 | Robbins | 222/76 X |
| 3,598,283 | 10/1971 | Kurtz et al. | 222/76 X |
| 3,666,928 | 5/1972 | Burke et al. | 235/92 FL |
| 3,696,236 | 10/1972 | Kus | 235/151.34 |

Primary Examiner—Joseph F. Ruggiero

[57] ABSTRACT

The invention relates to a computer and display system to be used for example in a gasoline dispenser in the same fashion as the conventional mechanical value register. The system is capable of electronically computing not only the amount of liquid dispensed based on a delivery pulse signal, but also the delivery cost dependent upon pre-selected cost per unit setting. This information, in the form of a seven segment display code, is multiplexed over a pair of conductors to one or more external displays or any device that can utilize the signal. The system, by the use of digital displays and electronic circuitry, will inherently round value amounts to the nearest correct unit. A modified form of the system can employ a redundancy circuit as a self-checking feature. Additionally, it can be used as a computer and display in any system involving quantitative measurements.

20 Claims, 7 Drawing Figures

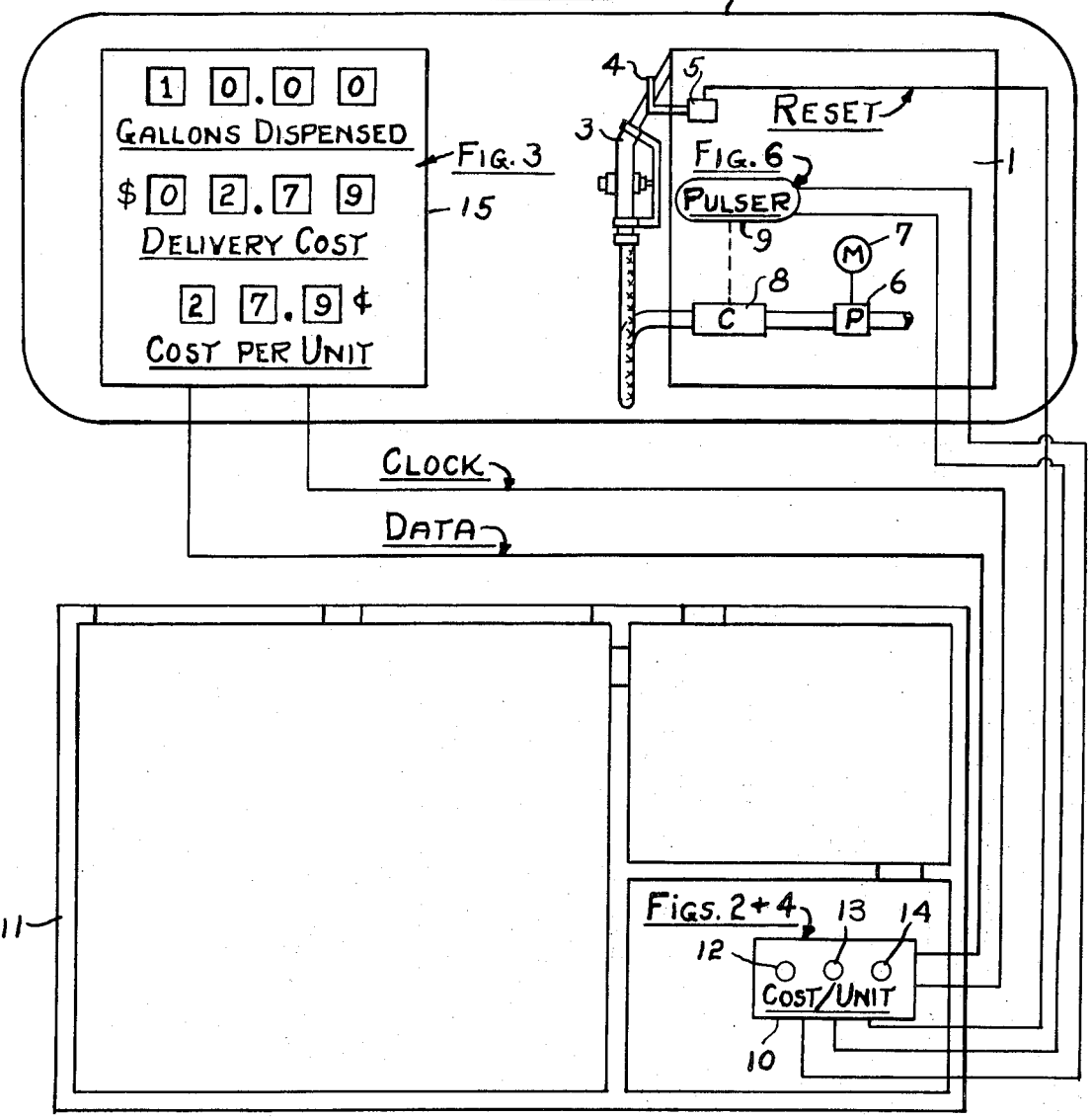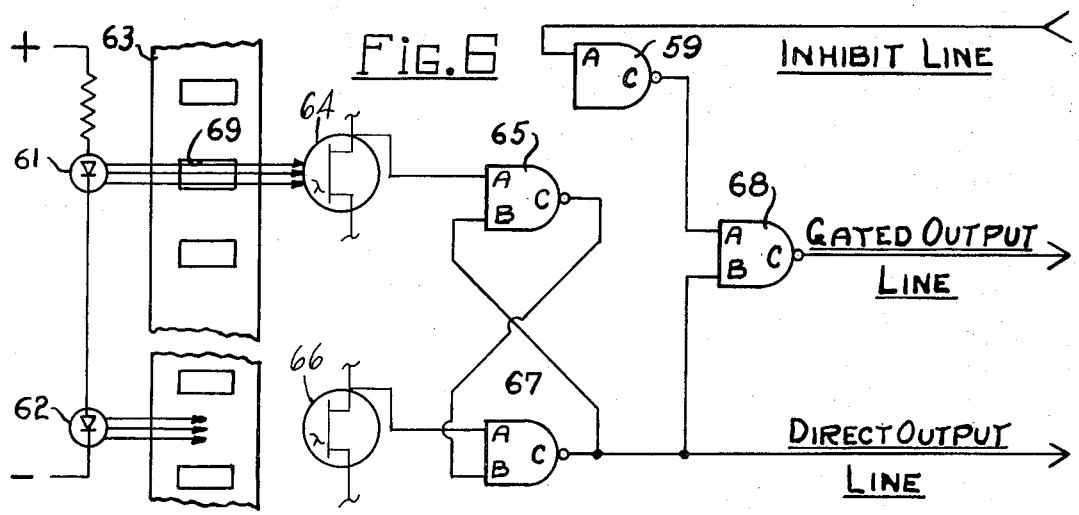

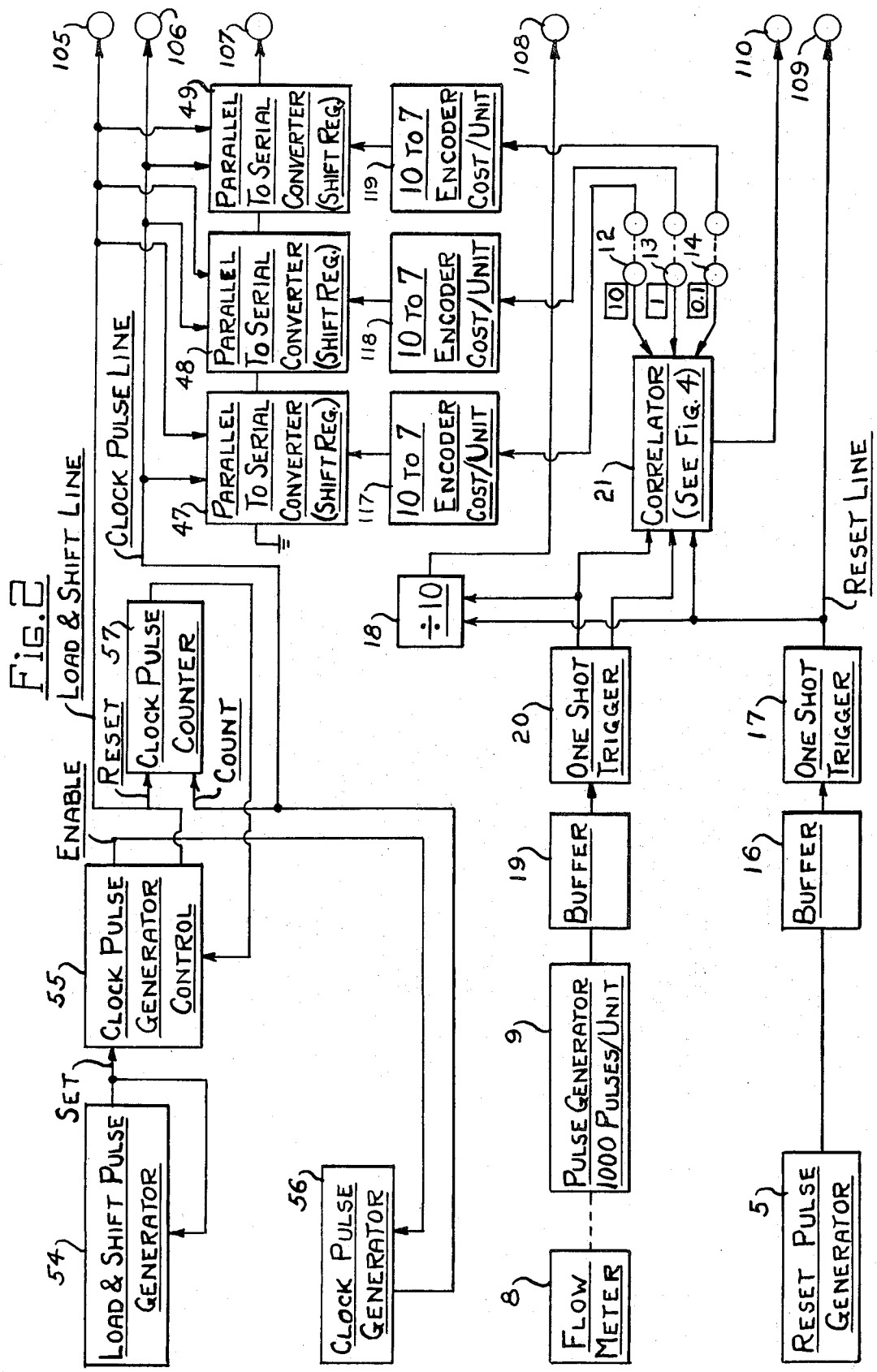

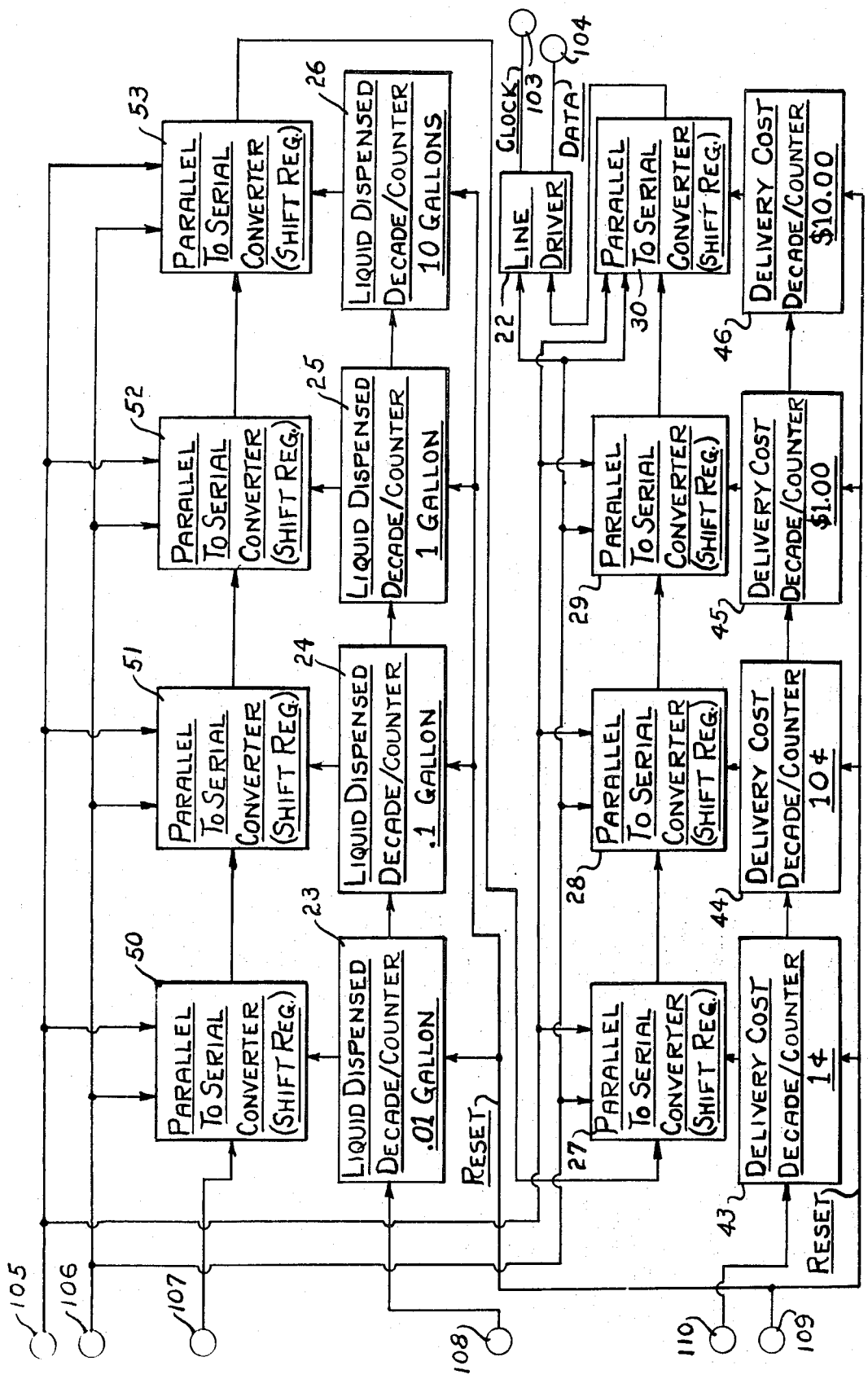

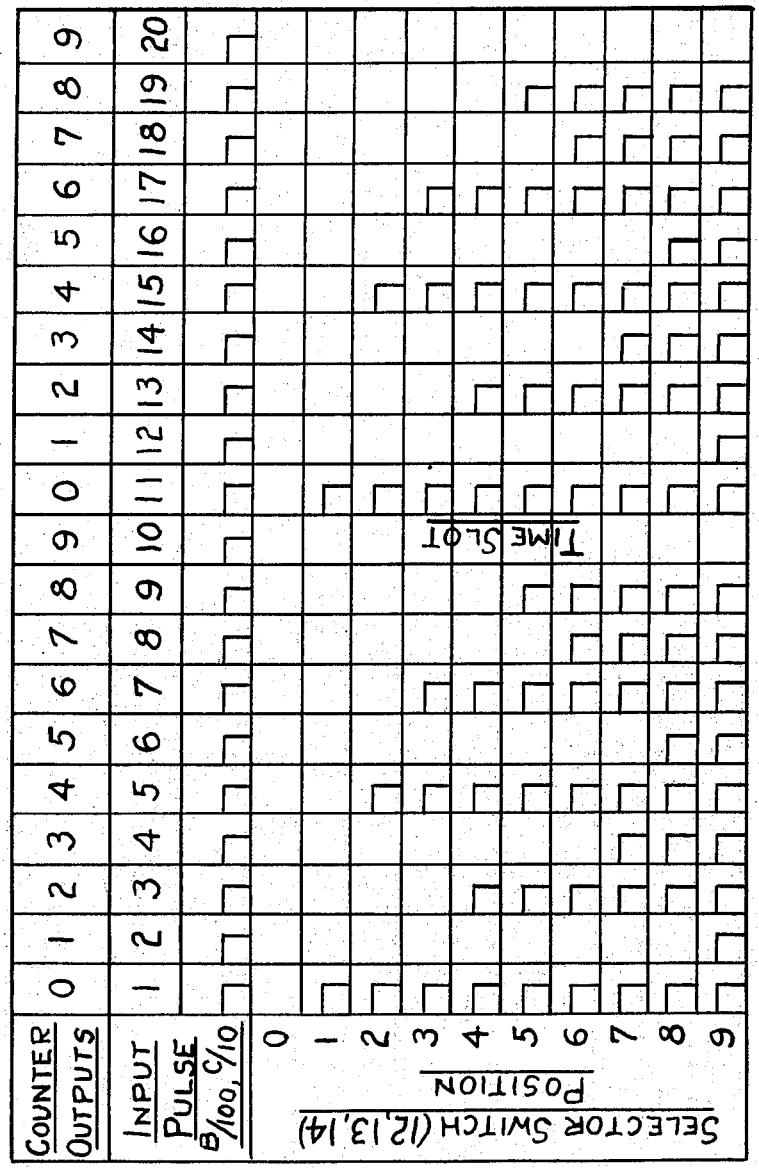

LIQUID DISPENSER WITH ELECTRONIC COMPUTING AND DISPLAY SYSTEM

SUMMARY OF THE INVENTION

The invention relates to a computer and display system and is of special relevance to a gasoline dispenser as a means to measure and reflect the dispenser output.

Conventional dispensers generally being used contain a mechanical value register type computer to measure and display the yields in response to a flow meter mechanically connected to the computer. Where it is desirable to display at a location remote from the dispenser, or to alter the basic design appearance of a dispenser, present systems are highly unsuitable, primarily because of their nature which requires substantial mechanical interconnections between components. Furthermore, accuracy in measurement and display is of the utmost importance to meet state and federal weight and measurements regulations. Through the use of the apparatus herein disclosed, many advantages, presently not possible with a mechanical value register, are gained.

The present invention has been found to be particularly advantageous, over existing systems, in its ability to interface with data processing equipment, something if at all possible, nevertheless would be prohibitively expensive for a mechanical system. Additionally, flexibility in the disclosed system is gained by multiplexing the data serially between the computer and display. Present mechanical value registers display (11) digits [(3) price per gallon, (4) gallons dispensed, and (4) delivery cost.] Since each digit requires seven segments of data for its display, by multiplexing the data through a pair of wires, (75) interconnecting wires have been eliminated. The savings here, in addition to material and maintenance cost, is realized in the installation cost.

Another problem relating to mechanical value registers is that of limited visibility of the display. For example, in the current design the physical nature of the display placement results in a situation whereby only the attendant can see the display while the customer can not, or vice versa. By employing an electronic or electro-mechanical display and multiplexing the signals, it is possible to have a plurality of displays while also permitting a more convenient positioning of the displays at locations remote from the dispenser. Also by the elimination of the mechanical computer, the reset mechanism currently required is eliminated. By resetting to zero count state electronically, the manual reset system consisting of a lever and gear train and in the automatic reset system consisting of a motor, gear train, and switches to physically turn the mechanical computer to zero are not required; thus, considerable simplicity is achieved.

It will now be evident that the primary objective of this invention is to provide a simple electronic computer and display system having no moving parts, more reliability, fractional power requirements, greater accuracy, adaptable to self-service and remote control units, smaller in size and weight, local or remote display capabilities, competitive in price, and adaptable primarily to gasoline service station applications.

Another object of this invention is to provide a system that will replace the conventional mechanical value register and thereby eliminating the need for any bulky mechanical interconnections, thus achieving greater flexibility in the design of station appearance.

Still another object of this invention is to provide a system that will replace a dual produce mechanical blender in that the computer can totalize dual input data signals as well as single inputs.

Yet another object of this invention is to provide a single computer and display system that is capable of handling a plurality of dispensers having different products.

Still another object of this invention is to provide a single enclosure, conveniently located within station house, that contains all controls thereby being less vulnerable to tampering or vandalism.

A further object of the invention is to provide a system whereby the price per unit, shown at the local or remote display unit, can be easily changed from within the station house.

Yet another object of this invention is to provide a versatile display system, not limited to the traditional small white on black numerals, but adaptable to various sizes of lighted or unlighted colored displays using seven segment binary coded deciminals, or other code.

A further object of this invention is to provide a computing system small enough as to house many computers in a reasonably sized enclosure capable of computing, storing, and providing display information from data generated by many dispensers operating simultaneously.

Another object of this invention is to provide a single enclosure located within the station house that functions as a data processing center in that all data signals generated by each dispenser enter the enclosure and from the enclosure are generated signals containing delivery cost, cost per unit, and liquid dispensed information and are directed to their respective end use.

It is another object of the instant invention to provide a simple pulse producing system for use with the computer which is, while connected directly to a flow measuring device, not susceptible to vibration, ambient electronic noise, or partial irradiation.

Yet another object of this invention is to provide a computer whose output signals are capable of interfacing with other data processing equipment, such as digital display system, ticket printer, data transmission network, central computer, credit card validator, tax totalizer, storage device or any device that can utilize the signal.

Another object of this invention is to provide a system in which the display unit is capable of being physically located remotely from the dispenser pedestal in order to be perceptible by both the attendant and customer simultaneously.

Still another object of this invention is to provide a digital display that is automatically operable to round off the cost display to the correct unit, thereby eliminating any exercise of interpretation by the attendant as required by the present mechanical analog display.

A further object of this invention is to provide a system at a reduced cost, primarily by the elimination of mechanical components and the substitution of printed circuitry which conform to mass production fabrication techniques.

Other objects will be in part obvious and in part pointed out in more detail hereinafter.

The above-mentioned and further objects, advantages, and features of the invention, said features being set forth in the claims annexed hereto, will be apparent from, and will be set forth in, the following with reference to an embodiment of a liquid dispenser with electronic computing and display system according to the invention illustrated by way of example in the accompanying drawing:

BRIEF DESCRIPTION OF THE DRAWINGS

In the drawings:

FIG. 1 is a block diagram showing a dispenser, computer, and display unit relative to a conventional service station.

FIG. 2 is a block and schematic diagram of a computer and transmitting system according to the invention.

FIG. 2A is a continuation of the block and schematic diagram of FIG. 2.

FIG. 5 is a table showing the pulse output distribution for each switch position.

FIG. 6 is a pictorial illustration and schematic diagram of a pulser unit to be used in a computer according to the invention.

DESCRIPTION OF THE PREFERRED EMBODIMENTS

Figure 3:
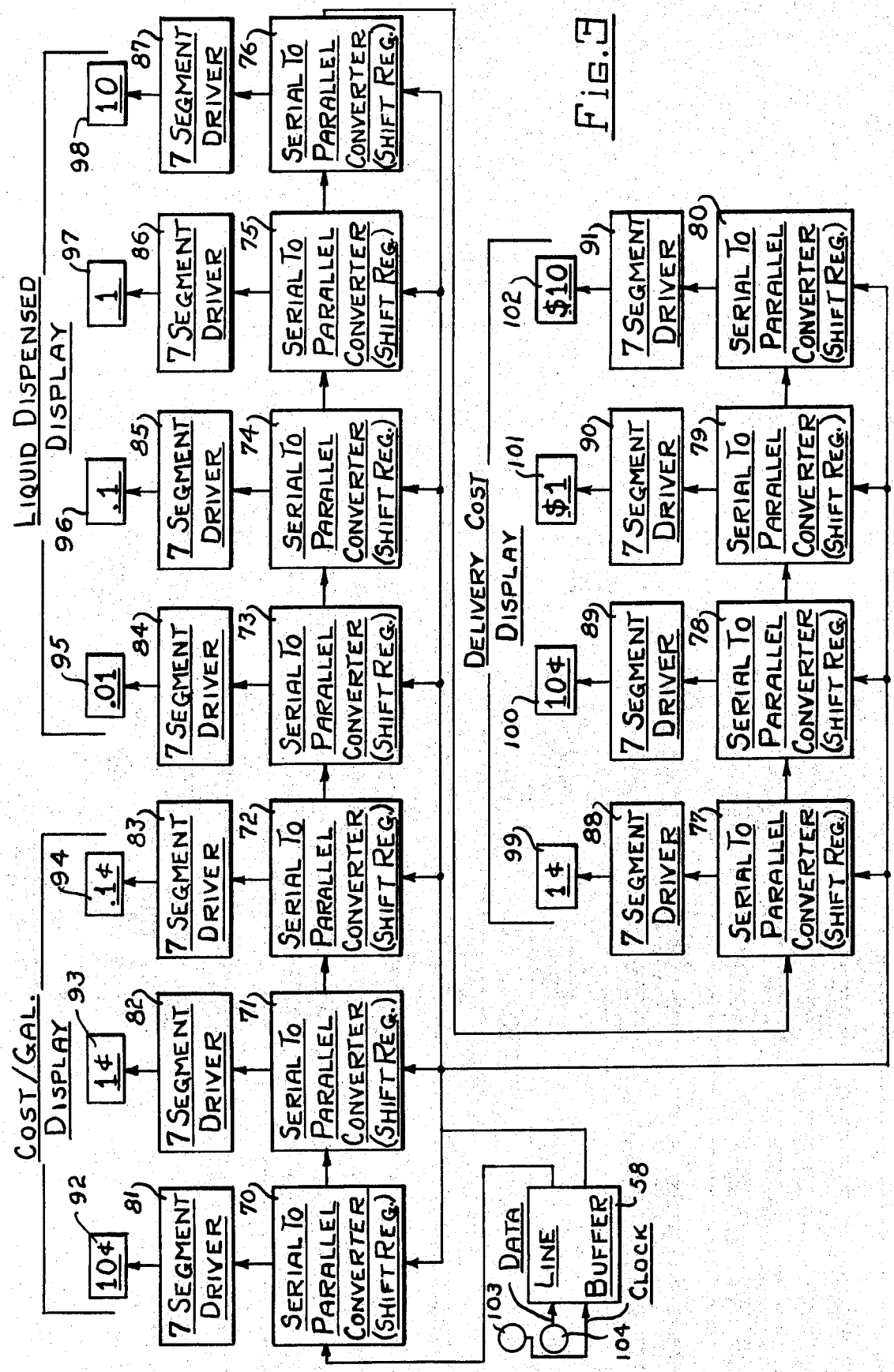
FIG. 3 is a block and schematic diagram of a receiving and display system according to the invention.

Briefly stated, the present invention provides a simple computing system for a retail liquid dispenser. Delivery pulses, representing a quantity of liquid dispensed, are supplied to a computer which contains a means for pre-setting the cost per unit. The computer output which is multiplexed thru a pair of wires to a local or remote display is capable of continuously displaying the amount of liquid dispensed, (gallons, for example) the delivery cost (dollars and cents, for example) and the cost per unit (cents, for example). The dispenser equipment can be located up to (100) feet from the computer while the display unit can also be located up to (100) feet from the computer. A modification of this system contemplates a plurality of dispensers with or without different products to be handled by a like unit or a single dispenser with more than one display unit.

Referring now to the drawings, wherein like reference numerals relate to similar structure throughout the plurality of views. FIG. 1 generally shows a gasoline service station which utilizes the computer system according to the invention. Such a station comprises a dispenser 1 on a service island 2. An attendant removes nozzle 3, turns handle 4 to actuate reset pulser switch 5, also shown in FIG. 2, and proceeds to dispense liquid. The dispenser 1 is connected by piping to a liquid storage reservoir, not shown, whereby pump 6 and motor 7 are the means for supplying the flow of liquid. The pump 6 output is measured by meter 8 which is connected through gearing to a pulse generator 9, shown in detail in FIG. 6.

Figure 4:
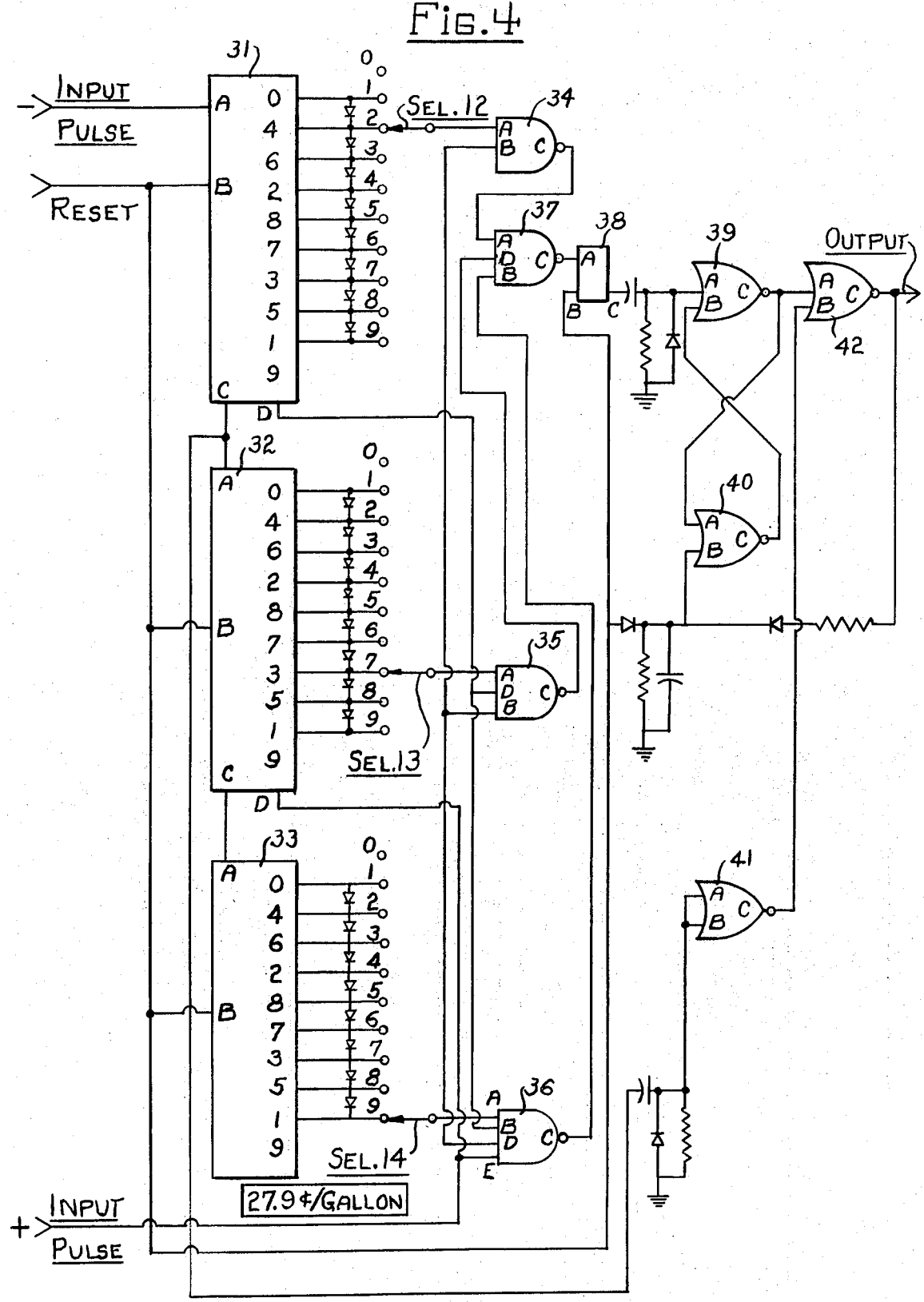
FIG. 4 is an electrical schematic diagram of a correlator unit for the computer according to the invention.

A delivery signal, for example one thousand pulses per gallon delivered, is transmitted to the computer 10, shown in detail in FIG. 2 and 4, which is conveniently located inside the station house 11. Computer 10 has three (3) manual external switches 12, 13 & 14 for the operator to pre-set the cost per unit of liquid to be dispensed. The computer output is multiplexed to a remote display 15 as shown in detail in FIG. 3, conveniently located for customer and attendant observation.

The pulser 9, shown in FIG. 6, operates on a photoelectronic principle whereby a flat disc 63 connected through a set of gears to a mechanical flow meter 8 is rotated in direct proportion to the quantity delivered. The disc 63 is provided with a plurality of apertures, similar to 69, and so arranged to provide a fixed number of pulses per gallons delivered. The disc 63 rotates between (2) light emitting diodes 61 and 62 and (2) photo transistors 64 and 66. By arranging the apertures such that when aperture 69 allows transistor 64 to be irradiated, the disc is so positioned to prevent the light emitted from diode 62 from reaching transistor 66. When transistor 66 is irradiated, transistor 64 is not. The outputs of both photo transistors 64 and 66 are connected to (2) NAND circuits 65 and 67 which are arranged in a flip-flop configuration. The outputs are used for direct pulsing and for gates pulsing by virtue of NAND circuit 68.

More specifically, when the light emitted by diode 61 reaches transistor 64, this causes transistor 64 to saturate and a low voltage to be applied to terminal A of NAND circuit 65. The light from diode 62 is prevented from reaching transistor 66 by disc 63 so transistor 66 is in cutoff and thereby applies a high voltage to terminal A of NAND circuit 67. Since a high voltage exists at terminal B of NAND circuit 67 due to the low voltage applied to terminal A of NAND circuit 65 causing terminal C to go high, the output at terminal C of circuit 67 goes low. This low voltage is applied to the direct output line forming the low voltage portion of the delivery pulse cycle and is also fed to terminal B of NAND circuit 65 to hold terminal C high. In the event that terminal A goes high due to partial irradiation of transistor 64, thereby causing it to oscillate, or in the event disc 63 vibrates due to external forces applied to it, terminal C of the NAND circuit is held high by this system. Also the output of terminal C of NAND 67 is applied to terminal B of NAND circuit 68 causing terminal B to be low. If terminal A is high due to terminal C of NAND circuit 59 being high caused by terminal A being low, the voltage at terminal C of NAND 68 will go high and the positive portion of the gated pulse output will be generated. If terminal A NAND circuit 68 were low, no change would occur at C and thus no output pulse.

When the light emitted by diode 61 is shaded from photo-transistor 64 due to the disc 63 rotating a small amount, transistor 64 goes into cutoff and transistor 66 is still cutoff. A high voltage is applied to terminal A of NAND circuit 65 but does not cause a change at terminal C due to terminal B being held low. A further rotation of the disc 63 will cause transistor 66 to be irradiated and go into saturation causing a low voltage to be applied to terminal A of NAND circuit 67. Since terminal B is high, terminal C will go high. This high voltage is applied to the direct output line forming the high voltage portion of the delivery pulse cycle and is also fed to terminal B of NAND circuit 65. Because both terminals A and B of NAND circuit 65 are high, terminal C goes low. Terminal C of NAND circuit 65 is connected to terminal B NAND circuit 67 and is held low to prevent any furhter voltage changes at terminal A of NAND circuit 67 caused by the photo-transistor oscillating. This could occur due to partial irradiation, or the external force causing the disc to vibrate. Also the output of terminal C of NAND circuit 67 is applied to terminal B of NAND circuit 68 causing terminal B to go high. If terminal A is high as before, then terminal C will go low and the low voltage portion of the gated pulse output will be generated. This cycle will be repeated as the disc rotates.

The unique feature of this pulser is that it will not produce extraneous pulses due to partial irradiation of either photo-transistor or due to small movements of the disc caused by vibration.

The reset pulse generator 5 shown in FIG. 1 and 2 is merely a mechanical switch that is closed when complete circuit reset is desired by the attendant. In this system the switch is closed when the dispenser operating handle 4 is raised, thereby closing the switch and causing the reset buffer 16 and one-shot circuit 17 to generate a single pulse having a controlled width of approximately 4.5 ms. This pulse is applied to a ÷10 circuit 18; liquid dispensed decade/decoders 23, 24, 25 & 26; delivery cost decade/decoders 43, 44, 45 & 46; and the correlator 21, shown in FIG. 4. This pulse serves to reset these circuits to thier O pulse count state. The delivery pulses generated by the pulser 9 are applied to a buffer 19 and one-shot circuit 20. This produces an output delivery pulse having a controlled width of 1 ms. only for each positive transition of the incoming pulse. This circuit serves to produce a delivery pulse output to the counting circuit only when its input undergoes a positive voltage transition. This allows the pulser output to remain high or low without any effect on the counting circuits.

The buffer 19 and one-shot circuit 20 produce both a positive and negative going pulse. The positive pulse is fed to the ÷10 circuit 18 and the correlator circuit 21. The negative going pulse is fed to the correlator 21 only. The ÷10 circuit 18 is a decade counter/divider circuit with 10 decoded decimal outputs and advances 1 count at each positive transition of the pulses generated by the one-shot circuit 20. A positive going output pulse is generated by the ÷10 circuit 18 at the positive transition of each tenth input pulse and is applied to the liquid dispensed decade/counter 23. This circuit is a decade/counter having a decoded output used for seven segment display, and advances one count with each positive pulse transition generated by the ÷10 circuit 18. In addition to the seven decoded outputs, a carry signal is generated and applied to the decade counter 24 at each positive transition of the tenth input pulse. Liquid dispensed decade/counters 25 and 26 function in the same manner as 23 and 24 as described above. The delivery cost decade/counters 31, 32, 33 $ 34 also function in the same manner as the liquid dispensed decade/counters except that they are fed by the positive going output pulses generated by the correlator 21 in FIGS. 2 and 4. The correlator 21 circuit shown in FIGS. 2 and 4 is a pre-settable divider circuit that is set by three (3) selector switches 12, 13 & 14 to generate an output pulse to input pulse ratio of 1/1000 to 999/1000 and settable in increments of one pulse. The circuit is such that an output pulse is generated only on the tenth input pulse and on each succeeding tenth pulse. This is to synchronize the liquid dispensed display and delivery cost display so as not to display different values of delivery cost for a given quantity of liquid dispensed. Stated a different way, since the liquid dispensed display is in 0.01 gallons, 0.01 gallons is 10 pulses generated by the pulser) the pulse generated by the correlator 21 is stored in the correlator until 10th pulse increments, (when the liquid dispensed display makes a change), then the pulse is gated out to update the delivery cost display.

The correlator circuit 21, as shown in detail in FIG. 4, operates as follows: A negative going pulse is generated by the buffer 19 and one-shot 20 and is applied to the decade counter/divider circuit 31. The outputs of this circuit are connected to a ten position switch 12. The switch position determines the number of output pulses. In combination of 31 and 12, switch position 1 produces one output pulse per ten input pulses, switch position 2 produces two output pulses for 10 input pulses, position 3 produces three pulses per 10 and so on up to position 9 producing nine output pulses per 10 input pulses. The counter advances one count for each positive transition of the input pulse. The output pulses are applied to a two input NAND circuit 34 terminal A. Terminal B is fed with the positive going pulse generated by the buffer 19 and one-shot 20 and is used to gate out the pulse applied to terminal A.

Two more outputs are generated by the decade counter/divider 31, one of which is generated from terminal C at each positive transition of the 10th input pulse terminal A. This pulse serves to advance the next decade by one and is also used to gate the output circuit 42 thru the phase inverter circuit 41 to generate an output pulse only at each tenth input pulse. The reason being previously explained. The other pulse is a positive going pulse generated by terminal D. This terminal goes high on the ninth input pulse and every ten pulses thereafter and serves to gate circuit 35.

During the time when terminal D is high, all outputs to selector switch 12 are low, thus providing a time slot (see FIG. 5) to generate a pulse from circuit 32 by gating the NAND circuit 35. In the same manner, a time slot becomes available when terminal D of 34 and D of 32 go high (thus all outputs to selectors 12 and 13 go low) and are applied to NAND circuit 36 to gate out a signal generated by 33. The decade/decoder 32 operates in the same manner as the first except it produces one output pulse for each 100 input pulses applied to terminal A of 31 (circuit 31 acts as a ÷10) when selector 13 is in position 1, 2 for 100 in position 2, 3 for 100 in position 3 and so on. The output pulses of 32 are applied to a three input NAND circuit 35 and are gated out in the time slot provided by terminal D of 31 going high and the positive going input pulse going high on circuit 35 terminal B. The second decade/ divider circuit 32 has two additional output. One of which is generated from terminal C at each positive transition of the 100th negative input pulse to 31 terminal A or each tenth pulse at terminal A of 32. This pulse serves to advance the last decade by one. The other pulse is a positive going pulse generated at terminal D and goes high at the 90th and every 100th pulse thereafter and serves to gate NAND circuit 36 terminal D. The third decade/divider 33 operates in the same manner as the first and second except produces one output pulse for 1,000 negative input pulses applied to terminal A of 31 with the selector switch 3 in position 1, 2 for 1,000 in position 2, 3 for 1,000 in position 3 and so on. The output pulses of 33 are applied to a four input NAND circuit 36 and are gated out in the time slot provided by terminal D of 32 going high (on 90 pulse) and terminal D of 31 going high (on nine pulse) causing terminal B of 36 and terminal D of 36 to both be high on 99 pulses and every 100 pulses thereafter.

The outputs of the three NAND circuits in 34, 35 & 36 are combined in the positive NAND or negative NOR circuit 37. The output of this circuit is applied to a decade counter/divider circuit 38. This circuit has two functions. It serves as a ÷ 10 circuit to convert the pulses generated by the NAND circuit 37 that have a value of 0.1 cents each to pulses that have a value of one cent each and has a 0.5 cent preset. The 0.5 cent pre-set causes the penny pulses generated at terminal C of 38 to occur at the half cent increment such as 0.5, 1.5, 2.5, 3.5, 4.5, 5.5 cents and so on. This arrangement ensures round off to the nearest cent. This is accomplished by pulses having a value of 0.1 cent each being applied to terminal A of the decade/divider 38 and the output taken from terminal C which goes high on the count of six and thus generating an output. An output is generated on the sixth input pulse rather than the fifth as would be expected because the first pulse generated by the first decade counter is not used and is cancelled by this method.

The output pulses generated by the decade/divider circuit 38 terminal C are applied to the NOR circuit 39 terminal A. This circuit working in conjunction with 40 comprises a conventional flip-flop storage circuit. The function of this circuit is as follows: A positive going pulse generated by 38 from terminal C is applied to 39 terminal A causing the output terminal C to go low, thus the input of 40 to go low and its output terminal C to go high causing the second input of 39 terminal B to go high thus holding terminal C low when the pulse is removed from terminal A. This action stores the pulse generated by 38 in 39 whose output is connected to 42 terminal A which is performing the function of a negative NAND circuit (both inputs must go low to cause the output to go high). When decade 31 reaches a count of 10 it generates a positive going pulse from terminal C that is applied thru a capacitor to terminals A and B of 41 which causes the output of this circuit to go low and being connected to the second input of 42 terminal B also goes low causing the output terminal C to go high generating the leading edge of a positive going pulse. This output serves as the delivery cost having a value of one cent per pulse that is applied to the delivery cost decade counter 43 for counting and transmission (shown in FIG. 2) and is also fed back to circuit 40 terminal B for resetting the flip-flop circuit 39 and 40. The positive going pulse in terminal B of 40 causes the output terminal C to go low and thus the input terminal B of 39 to go low causing its output terminal C to go high applying a positive pulse to the inputs of 40 and 42. The positive applied to 40 holds its output low after the positive pulse is removed from terminal B, thus holding 39 output high. The positive applied to 42 terminal B causes its output to go low which forms the trailing edge of the positive going output pulse. Since 42 is being used as a negative NAND circuit, a negative pulse applied to terminal B has no effect. The sole purpose of the circuit comprised of 39, 40, 41 & 42 is to prevent generating a delivery cost pulse until a liquid dispensed pulse is generated to change the liquid dispensed display to the next 1/100 of a gallon. This occurs at each 10th input pulse.

The nine outputs of each of the decade counter/divider circuits 31, 32 & 33 are connected to the 10 position switches 12, 13 & 14 and are arranged in such a manner as to obtain the best even pulse distribution possible. The pulse outputs are distributed as shown in FIG. 5. In FIG. 5, the top row designates the energized state of each counter output relative to pulse inputs. For example, the O terminal is high when the counter is in its reset state with O count. Counter output one is high when one input pulse has advanced the count from O to one and so on. The input pulse row designates the number of the gate and step pulse. The selector switch position rows show the pulse output distribution for each switch position. For example, when a selector switch is in position 3 an output pulse is generated at the first input pulse, the fifth and seventh and then repeated for the next cycle of 10. The ideal condition would be an output pulse occurring at every three and one-half input pulses. Since this is impossible with this type of circuit, a compromised distribution was arrived at for all selector settings as shown in FIG. 5.

The correlator circuit mathematically functions as follows:

$A$ = Input pulses, thousands (each input pulse = 1/1000 gallon)
$B$ = Input pulses, hundreds
$C$ = Input pulses, tens
$X$ = Pulse output of second decade/divider
$Y$ = Pulse output of second decade/divider
$Z$ = Pulse output of third decade/divider
$T$ = Value derived from FIG. 5, Table 1
$S_1$ = 10's selector setting for switch 12
$S_2$ = 1's selector setting for switch 13
$S_3$ = 0.1's selector setting for switch 14
$4$ = Number of pulses required from the decades to initialize circuit 38 to produce pulses worth one cent each at the one-half cent to cause a round off to the nearest full cent.
$P$ = Pulses generated by circuit 38 (each pulse = 1 cent).

$$P = X + Y + Z + 4/10 \qquad 1.$$

The 10 divisor in formula 1 is due to circuit 38 converting 0.1 cent pulses to 1 cent pulses by divided by 10.

$$X = (A + B + C/10) S_1 \qquad 2.$$

$$Y = (A + B/100) S_2 + T (S_2, C/10) \qquad 3.$$

"T" is a function of $S_2$ and $C/10$, its value is taken from FIG. 5, Table 1, by finding the row corresponding to to the selector setting $S_2$ and counting the pulses in that row up to and including the column having the value of $C/10$.

$$Z = (A/1000) S_3 + T (S_3, B/100,) \qquad 4.$$

$$P = \left[\left(\frac{A+B+C}{10}\right)S_1\right] + \left[\left(\frac{A+B}{100}\right)S_2 + T\left(S_2, \frac{C}{10}\right)\right] + \left[\left(\frac{A}{1000}\right)S_3 + T\left(S_3, \frac{B}{100}\right)\right] + \frac{4}{10} \cdot 5.$$

Example:
4.75 gallons times 36.9 cents per gallon
$A = 4,000$
$B = 700$
$C = 50$
$S_1 = 3$
$S_2 = 6$
$S_3 = 9$ $X = (A + B + C/10) S_1 = 475 \times 3 = 1,425$ $Y = (A + B/100) S_2 + T(S_2, C/10,) = (47 \times 6) + 3 = 285$ $Z = (A/1000) S_3 + T(S_3, B/100,) = (4 \times 9) + 7 = 43$ $P = X + Y + Z + 4/10 = 1425 + 285 + 43 + 4/10 = 1,757/10 = 1757.7$ 175 pulses will be generated by the correlator to the delivery cost counter and ultimately to the display. Each pulse is worth one cent; therefore, $1.75 will be counted and displayed.

Actual money value of product delivered is 4.75 gallons times 36.9 cents per gallon equaling 175.275 cents, thereby showing a correlation between displayed delivery cost value and actual delivery cost value to nearest cent.

Mechanically connected to each cost/unit setting selector switch 12, 13 & 14 is an additional 10 position contact as shown in FIG. 2.

These are connected to encoders 117, 118 & 119 that convert the one out of ten decimal input to a seven segment code used to energize seven segment displays. In this application, the seven line outputs of the encoders 117, 118 & 119 are connected to parallel to serial converters 47, 48 & 49 that form part of the data transmission circuitry to be discussed later.

The output pulses of the correlator 21 are connected to the delivery cost decade/counters 43, 44, 45 & 46 that will count and store in seven segment code the number of pulses generated by the correlator. The outputs of the delivery cost decade/counters 43, 44, 45 & 46 and liquid dispensed decade/counters 23, 24, 25 & 26 like the cost per unit encoders 117, 118 & 119 are connected to parallel to serial converters that are used for data transmission.

The data transmission circuitry consists of shift register circuits used as parallel to serial converters 27, 28, 29, 30, 47, 48, 49, 50, 51, 52 & 53; a line driver 22 for clock and data transmission, along a maximum of (100) feet of line; and timing circuits consisting of 54, 55, 56 & 57.

The data receiving and display circuits are shown in FIG. 3 and consist of serial to parallel converters for the cost per gallon, liquid dispensed, and delivery cost displays. The parallel outputs of these circuits are connected to driver circuits 81 thru 91 that drive the seven segment displays 92 thru 102.

The data transmission and receiving circuits function as follows: The seven line information originating from the 10 line to seven line encoders 117, 118 & 119; the liquid dispensed decade/counters 23, 24, 25 & 26; and the delivery cost decade/counters 43, 44, 45 & 46 are applied in parallel (seven lines of positive going signals) to the parallel to serial converters as shown.

The parallel to serial converters 27, 28, 29, 30, 47, 48, 49, 50, 51, 52 & 53 are loaded with high or low signals (depending on the stage of the outputs of the liquid dispensed and delivery cost decade/counters and cost per unit decoders) when the load and shift control line shown in FIG. 2 goes high and then low. When the load and shift control line goes low, the clock pulse line is energized with 15 KHz pulses originating at the clock pulse generator 56. Each clock pulse causes the parallel to serial converter to shift the information stored in it to the right one place such that the pulses stored in shift register 30 are shifted to the line driver 22 synchronously. With each clock pulse, the information in shift register 29 is shifted into 30, and the information in shift register 28 is shifted into 29 and so on.

The serial input in shift register 47 is grounded; thus, zeros are shifted into the register as the information is being shifted out. This clears the register for the next loading. While the information is being synchronously shifted out of shift register 30 thru the line driver 22, the information is synchronously being shifted into the receiving serial to parallel converters thru the line buffer 58 by the same clock pulse. The serial to parallel converters are also shift registers that shift pulses to the right. A means must be provided to control the number of shifts required to transfer all the information loaded into the transmitting shift register to the receiving shift register. In this system, eleven displays are shown in FIG. 3, each display has seven segments and requires seven bits of information.

Thus $7 \times 11 = 77$. In order to shift 77 bits of information from the transmitting shift registers to the receiving shift registers, 77 clock pulses are required, no more or no less.

The clock pulse generator 56 is enabled by the clock pulse generator control 55. When the enabled line of 55 goes high, the reset line goes low; thus, the clock pulse generator is enabled and produces a pulse output. The load and shift line is therefore low placing the shift registers in the shift mode. The clock pulse generator 56 feeds the shift registers to shift out information and feeds a seven stage binary counter 57, the output of which goes high on the 77th pulse causing the clock pulse generator control reset line to go high thus causing the enabled line to go low. This cuts off the clock pulse generator thus causing the reset line to go high resetting the counter 57 to 0 and the load and shift line to go high thus placing the transmitting shift registers in the load mold. The time for loading is controlled in the load and shift pulse generator 54 and can be set for any time. In this application the time for loading is typically 0.07 seconds. Although in this system we chose to transmit the code used for the average seven segment displays, we may wish to transmit the BCD code or any other code that may serve our purpose.

It will be evident to those skilled in the art that the computer system as disclosed above might be employed in addition to conventional dispensers, but also any liquid handling self-service disposed, remote controlled dispenser, or any other high-resolution type system.

While a specific embodiment of the invention has been shown and described herein for the purpose of illustration, it is not desired that the protection afforded by any patent which may issue upon the application be limited strictly to the disclosed embodiment, but that it be extended to all structures and arrangements which contain the essence of the invention and which fall fairly within the scope of the claims which are appended hereto.

I claim:

1. A liquid dispensing apparatus comprising a manually operable nozzle valve, a pump for supplying a flow to said nozzle valve, a pump motor including power supply, a mechanical flow measuring means for determining the amount of liquid dispensed wherein the improvement comprises an electronic computer incorporated into said liquid dispenser, said computer comprising:
   a. delivery pulser means interconnected directly to said mechanical flow measuring means and capable of producing a plurality of output delivery pulses in direct proportion to said liquid dispensed;
   b. a pre-settable correlator means including a plurality of pre-settable divider circuits connected in series to said delivery pulser means to receive, accumulate, divide, and gate out said output delivery pulses;
   c. a data transmission means responsive to a plurality of signals and capable of counting and transferring said signals;
   d. a data receiving and display means operable to convert said signals to a numerical readout; and
   e. a reset means to clear said correlator, data transmission, and data receiving and display means to the zero state level.

2. A liquid dispensing apparatus comprising a manually operable nozzle valve, a pump for supplying a flow to said nozzle valve, a pump motor including power supply, a mechanical flow measuring means for determining the amount of liquid dispensed wherein the improvement comprises an electronic computer incorporated into said liquid dispenser, said computer comprising:
   a. delivery pulser means interconnected directly to said mechanical flow measuring means and capable of producing a plurality of output delivery pulses in direct proportion to said liquid dispensed, said delivery pulser means including:
      1. a circular disc containing a plurality of apertures around its edge and connected thru gearing means to said mechanical flow measuring means as to be responsive thereto;
      2. a plurality of light emitting diodes positioned in a plane about the axis of said disc and in the path of said apertures;
      3. a delivery pulse producing means;
      4. a buffering means responsive to said delivery pulse and effective to reduce noise and line distortion; and
      5. a signal conditioning means operable by one of said delivery pulses for producing a delivery pulse output having a determinable wave shape;
   b. a pre-settable correlator means responsive to said delivery pulser means and operable to accumulate, divide, and gate out said output delivery pulses;
   c. a data transmission means responsive to a plurality of signals and capable of counting and transferring said signals;
   d. a data receiving and display means operable to convert said signals to a numerical readout; and
   e. a reset means to clear said correlator, data transmission, and data receiving and display means to the zero state level.

3. The pulser means recited in claim 2 wherein said delivery pulse producing means comprises:
   a. a pair of photo transistors positioned in relation to said pair of light emitting diodes in such a manner that only one of the set is irradiated at a given position of said disc apertures; and
   b. a bistable means comprising a flip-flop to further limit production of said output pulses to a point in time only when one of the set of said photo transistors is irradiated.

4. A liquid dispensing apparatus comprising a manually operable nozzle valve, a pump for supplying a flow to said nozzle valve, a pump motor including power supply, a mechanical flow measuring means for determining the amount of liquid dispensed wherein the improvement comprises an electronic computer incorporated into said liquid dispenser, said computer comprising:
   a. delivery pulser means interconnected directly to said mechanical flow measuring means and capable of producing a plurality of output delivery pulses in direct proportion to said liquid dispensed;
   b. a pre-settable correlator means responsive to said delivery pulser means and operable to accumulate, divide, and gate out said output delivery pulses, said pre-settable correlator means including:
      1. a plurality of pre-settable divider circuits, connected in series, wherein one pre-settable divider is provided for each digital control function;
      2. a round-off control means to count, store and divide the delivery cost signal; and
      3. a synchronizer means operable between a liquid dispensed signal and said delivery cost signal to update said data transmission means and said data receiving and display means;
   c. a data transmission means responsive to a plurality of signals and capable of counting and transferring said signals;
   d. a data receiving and display means operable to convert said signals to a numerical readout; and
   e. a reset means to clear said correlator, data transmission, and data receiving and display means to the zero state level.

5. A computer system recited in claim 4 wherein said plurality of pre-settable divider circuits comprises:
   a. a plurality of manual cost per unit switch means; and
   b. an equal number of decade counter/divider means for each numerical control of the cost per unit capabilities.

6. A computer system recited in claim 4 wherein said round-off control means comprises a decade counter/divider to round-off said delivery cost signal to the nearest whole unit.

7. A computer system recited in claim 4 wherein said synchronizer means includes:
   a. a flip-flop means consisting of two NOR gates connected to receive and store said delivery cost signal by being toggled back and forth by the combined inputs of the said round-off control means and in effect its own output;

b. a first NAND gate means receiving as its inputs the output of the first in the series of said pre-settable decade counter/dividers and thereby gating an output signal only when there has been a decade of said delivery pulses supplied thereto; and c. a second NAND gate receiving as its input the output of said flip-flop and said first NAND gate in operable to only gate out said delivery cost signal when its inputs are coincident.

8. A computer system as recited in claim 5 wherein said plurality of manual cost per unit switch means further comprises:

a. a 10 position selector switch for pre-selecting each numeral in the 1/10 series of cost per unit capabilities; and b. a ten position selector switch for pre-selecting each numeral in the one series of cost per unit capabilities; and c. a ten position selector switch for pre-selecting each numeral in the ten series of cost per unit capabilities.

9. A liquid dispensing apparatus comprising a manually operable nozzle valve, a pump for supplying a flow to said nozzle valve, a pump motor including power supply, a mechanical flow measuring means for determining the amount of liquid dispensed wherein the improvement comprises an electronic computer incorporated into said liquid dispenser, said computer comprising:

a. delivery pulser means interconnected directly to said mechanical flow measuring means and capable of producing a plurality of output delivery pulses in direct proportion to said liquid dispensed;

b. a pre-settable correlator means responsive to said delivery pulser means and operable to accumulate, divide, and gate out said output delivery pulses, said pre-settable correlating means including a plurality of pre-settable divider circuits each including a plurality of manual cost per unit switch means;

c. a data transmission means responsive to a plurality of signals and capable of counting and transferring said signals, said data transmission means including:

1. a cost per unit signal producing and transmitting means responsive to a plurality of said manual switches;

2. a delivery cost signal producing and transmitting means responsive to the output signal of said correlator;

3. a liquid dispensed signal producing and transmitting means responsive to said delivery pulser means output;

4. a timing means operable to synchronize said data transmitting means as said data receiving and display means; and 5. a line driver means interconnecting said data transmitting means and said receiving and display means;

d. a data receiving and display means operable to convert said signals to a numerical readout; and e. a reset means to clear said correlator, data transmission, and data receiving and display means to the zero state level.

10. A computer system as recited in claim 9 wherein said cost per unit signal producing and transmitting means comprises:

a. a plurality of encoders operable to decode a decimal input signal;

b. a plurality of parallel to serial converters, each connected to said encoders and operable to be loaded with said decoded signals and to shift out said loaded signals upon being so clocked by said timing means.

11. A computer system as recited in claim 9 wherein said delivery cost signal producing and transmitting means and said liquid dispensed signal producing and transmitting means each comprises:

a. a plurality of decade/counters to encode and count input pulses; and b. parallel to serial converters connected to each of said decade/counters and operable to be loaded with said encoded signals and to shift out said loaded signals upon being so clocked.

12. A computer system as recited in claim 10 wherein said decode counters are operative to produce a seven segment display code from the input pulses.

13. A computer system as recited in claim 11 wherein said timing means comprises:

a. a load and shift means whose output signal is operable to place said parallel to serial converters either in the load mode or shift mode; and b. a clock pulse means whose output is connected to said parallel to serial converters and operable to allow the transfer out of said stored data signals.

14. A timing means recited in claim 13 wherein said load and shift means further comprises a clock pulse generator control and a load and shift pulse generator means responsive thereto.

15. A timing means recited in claim 13 wherein said clock pulse means further comprises:

a. a clock pulse generator means responsive to and enabled by;

b. a clock pulse generator control; and c. a clock pulse counter connected to said clock pulse generator means and effective to reset said clock pulse generator control.

16. A liquid dispensing apparatus comprising a manually operable nozzle valve, a pump for supplying a flow to said nozzle valve, a pump motor including power supply, a mechanical flow measuring means for determining the amount of liquid dispensed wherein the improvement comprises an electronic computer incorporated into said liquid dispenser, said computer comprising:

a. delivery pulser means interconnected directly to said mechanical flow measuring means and capable of producing a plurality of output delivery pulses in direct proportion to said liquid dispensed;

b. a pre-settable correlator means responsive to said delivery pulser means and operable to accumulate, divide, and gate out said output delivery pulses;

c. a data transmission means responsive to a plurality of signals and capable of counting and transferring said signals;

d. a data receiving and display means operable to convert said signals to a numerical readout, said data receiving and display means including:

1. a buffering means responsive to said signals and effective to reduce noise and line distortion;

2. a cost per unit signal receiving means;

3. a delivery cost signal receiving means;

4. a liquid dispensed signal receiving means; and 5. a display means; and e. a reset means to clear said correlator, data transmission, and data receiving and display means to the zero state level.

17. A computer system as recited in claim 10 wherein said data receiving and display means includes a plurality of serial to parallel converters coupled to said driver means, said driver means further comprising:
    a. a pair of conductors for transmitting said signals being shifted from said parallel to serial converters and a clock signal pulse to said serial to parallel converters;
    b. a transistor circuit to strengthen said data and clock signals in order to overcome line losses and interferences; and
    c. a line buffer responsive to said line driver and effective to reduce noise and line distortion.

18. A computer system as recited in claim 16 wherein said cost per unit signal receiving means, said delivery cost signal receiving means, and said liquid dispensed signal receiving means each comprises:
    a. a plurality of serial to parallel converters operable to be loaded with said signals and to shift out said signals upon being so clocked;
    b. a driver means connected to each of said serial to parallel converters to amplify the output signals; and
    c. a display means to visually represent said output signals in numeral form.

19. A computer system as recited in claim 16 wherein said display means further comprises seven segment readouts for each numeral control capabilities.

20. A liquid dispensing apparatus comprising a manually operable nozzle valve, a pump for supplying a flow to said nozzle valve, a pump motor including power supply, a mechanical flow measuring means for determining the amount of liquid dispensed wherein the improvement comprises an electronic computer incorporated into said liquid dispenser, said computer comprising:
    a. delivery pulser means interconnected directly to said mechanical flow measuring means and capable of producing a plurality of output delivery pulses in direct proportion to said liquid dispensed;
    b. a pre-settable correlator means responsive to said delivery pulser means and operable to accumulate, divide, and gate out said output delivery pulses;
    c. a data transmission means responsive to a plurality of signals and capable of counting and transferring said signals;
    d. a data receiving and display means operable to convert said signals to a numerical readout; and
    e. a reset means to clear said correlator, data transmission, and data receiving and display means to the zero state level, said reset means including:
        1. a manual reset means responsive to a dispenser operating lever and effective to produce a reset pulse with each manual reset operation;
        2. a buffering means responsive to said reset pulse and effective to reduce noise and line distortion; and
        3. a signal conditioning means operable by one of said reset pulses for producing a reset pulse output having a determinable wave shape.

* * * * *

UNITED STATES PATENT OFFICE
CERTIFICATE OF CORRECTION

Patent No. 3,813,527  Dated May 28, 1974

Inventor(s) Earl M. Langston

It is certified that error appears in the above-identified patent and that said Letters Patent are hereby corrected as shown below:

On Title Page Change Assignee's Name from "Takheim" to
---Tokheim---

IN THE SPECIFICATION

Column 1, Line 33, after "display" insert ---eleven---
Column 1, Line 34, after the bracket "[" insert ---three---
Column 1, Line 34, after "gallon," insert ---four---
Column 1, Line 34, after "and" insert ---four---
Column 1, Line 37, after "wires," insert ---seventy-five---
Column 2, Line 6, "produce" should be ---product---
Column 3, Line 45, after "to" insert ---one hundred---
Column 3, Line 47, after "to" insert ---one hundred---
Column 4, Line 15, after "between" insert ---two---
Column 4, Line 15, after "and" insert ---two--- (2nd occurrence)
Column 4, Line 22, after "to" insert ---two---
Column 5, Line 27, "thier" should be ---their---
Column 5, Line 56, "$" should be ---&---
Column 6, Line 4, after "gallons," insert ---(--- (1st occurrence)
Column 6, Line 6, after "until" insert ---the---
Column 6, Line 55, "output" should be ---outputs---
Column 9, Line 23, "1757.7" should be ---175.7---
Column 9, Line 57, insert ---one hundred--- before "(100)"
Column 10, Line 6, "stage" should be ---state---

Signed and Sealed this second Day of December 1975

[SEAL]

Attest:

RUTH C. MASON  
*Attesting Officer*

C. MARSHALL DANN  
*Commissioner of Patents and Trademarks*